US010896591B2

(12) United States Patent
Alameh et al.

(10) Patent No.: US 10,896,591 B2
(45) Date of Patent: Jan. 19, 2021

(54) EYEWEAR WITH PROXIMITY SENSORS TO DETECT OUTSIDE LINE OF SIGHT PRESENCE AND CORRESPONDING METHODS

(71) Applicant: Motorola Mobility LLC, Chicago, IL (US)

(72) Inventors: Rachid M Alameh, Crystal Lake, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 585 days.

(21) Appl. No.: 14/814,566

(22) Filed: Jul. 31, 2015

(65) Prior Publication Data

US 2017/0032646 A1 Feb. 2, 2017

(51) Int. Cl.
*G08B 21/02* (2006.01)
*G08B 21/22* (2006.01)
*G01V 8/10* (2006.01)

(52) U.S. Cl.
CPC .......... *G08B 21/0236* (2013.01); *G01V 8/10* (2013.01); *G08B 21/028* (2013.01); *G08B 21/0208* (2013.01); *G08B 21/0219* (2013.01); *G08B 21/0297* (2013.01); *G08B 21/22* (2013.01)

(58) Field of Classification Search
CPC .......... G08B 21/0236; G08B 21/0208; G08B 21/0219; G08B 21/028; G08B 21/0297; G08B 25/016; G08B 25/10; G08B 25/009; G08B 13/19684; G08B 15/004; G08B 21/02; G08B 21/0202; G08B 25/12; G01V 8/10; G06Q 10/10; H04W 4/02

USPC ..................................................... 340/539.11
See application file for complete search history.

(56) References Cited

U.S. PATENT DOCUMENTS

| | | | |
|---|---|---|---|
| 2008/0144854 A1* | 6/2008 | Abreu | G02C 3/003 381/74 |
| 2011/0144453 A1* | 6/2011 | Kovarik | A61B 10/0038 600/300 |
| 2012/0218115 A1 | 8/2012 | Chupa | |
| 2015/0205348 A1 | 7/2015 | Nortrup et al. | |

(Continued)

FOREIGN PATENT DOCUMENTS

| | | |
|---|---|---|
| WO | 2008020362 | 2/2008 |
| WO | 2014013101 | 1/2014 |

OTHER PUBLICATIONS

The American Heritage College Dictionary, Houghton Mifflin Company, 2002, 4th Edition.*

(Continued)

*Primary Examiner* — Omer S Khan
(74) *Attorney, Agent, or Firm* — Philip H. Burrus, IV

(57) ABSTRACT

Eyewear includes a frame and one or more stems extending distally from the frame. One or more processors are disposed within one or more of the frame or the stems, and one or more proximity sensor components are disposed within the stems defining thermal reception beams oriented in a rearward facing direction. Each proximity sensor component can include an infrared signal receiver to receive an infrared emission from an object. The one or more processors can execute a control operation when the proximity sensor components receive the infrared emission from the object.

18 Claims, 8 Drawing Sheets

(56) References Cited

U.S. PATENT DOCUMENTS

2015/0213306 A1* 7/2015 Hou ...................... H04N 7/183
                                                          382/118
2016/0093207 A1* 3/2016 Di Censo ............. H04R 1/1091
                                                          340/944

OTHER PUBLICATIONS

The Webster's II New Riverside University Dictionary, Riverside Publishing Company, 1988.*
Meister, Mark , "EPO Search Report", EP 16179312.0-1810; dated Dec. 6, 2016.

* cited by examiner

EYEWEAR WITH PROXIMITY SENSORS TO DETECT OUTSIDE LINE OF SIGHT PRESENCE AND CORRESPONDING METHODS

BACKGROUND

Technical Field

This disclosure relates generally to electronic devices, and more particularly to portable electronic devices having proximity sensors.

Background Art

Proximity detectors can be disposed along flat surfaces of an electronic device to detect the presence of an object before it comes in contact with the flat surface of the device. Illustrating by example, active proximity detectors can be disposed near the display of a mobile communication device. Transmitters of those active proximity detectors emit an electromagnetic or electrostatic field. A receiver then receives reflections of the field from the nearby object. The receiver detects changes in the received field to detect positional changes of nearby objects. The presence of an object can be used to control functions of the electronic device.

For example, when an electronic device determines from the proximity detector that a user's face is proximately located with the device, the device may reduce speaker volume so as not to over stimulate the user's eardrums. As another example, the proximity detector may turn off the device display when the device is positioned near the user's ear to save power.

While active proximity detectors work well in practice, they are not without operational issues. Active proximity detectors typically consume relatively large amounts of power due to the power consumed by the transmitter of the active proximity detector. Additionally, many active proximity detectors only work at short ranges. It would be advantageous to have an improved system and device providing new applications for proximity detecting devices, and one that offers additional configurations and feature sets.

Figure 1:
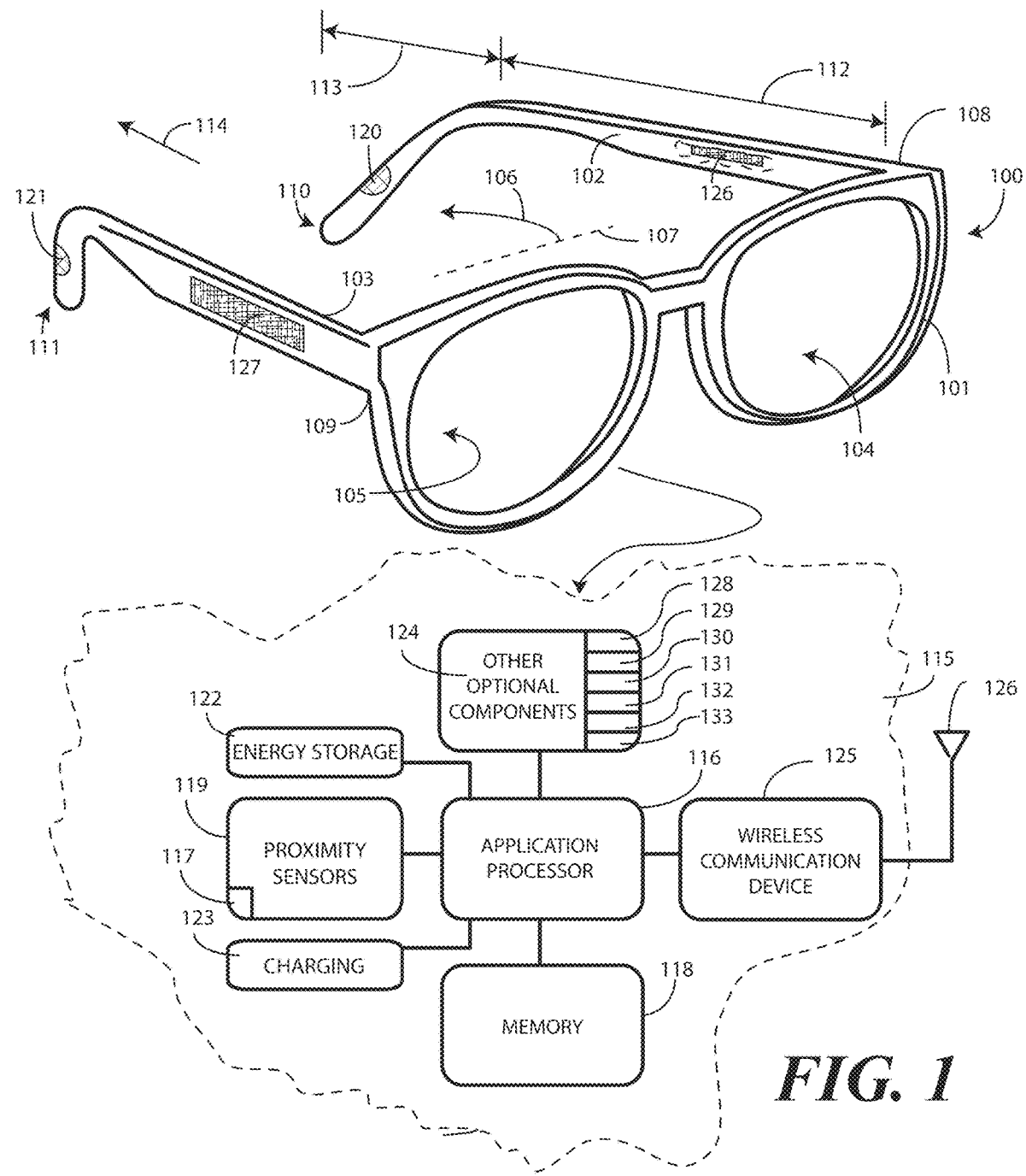
FIG. 1 illustrates explanatory eyewear having proximity sensor components in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to detect objects from different directions relative to an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of detecting, with proximity sensor components, received infrared emissions, and optionally determining from which direction those emissions originated. The non-processor circuits may include, but are not limited to, a radio receiver, a radio transmitter, signal drivers, clock circuits, power source circuits, and user input devices. As such, these functions may be interpreted as steps of a method to detect infrared emissions and/or from what direction those infrared emissions are received. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide eyewear equipped with proximity sensor components to detect thermal emissions from objects along directions a user otherwise would not see. The eyewear can be configured in a number of different types, including eyeglasses, sunglasses, goggles, masks, shields, visors, and so forth. In one embodiment, the eyewear comprises a frame and one or more stems that extend distally from the frame when in an open position. The stems can optionally be configured to pivot relative to the frame to open from a closed position to a radially displaced open position in which they extend distally from the frame. In other embodiments, however, the stems may be fixed relative to the frame. In yet other embodiments, such as may be the case with a mask or goggles, the stems may be manufactured from a flexible or elasticized material and may only extend distally from the frame when worn by a wearer.

In one embodiment, the eyewear defines a portable electronic device. For instance, the eyewear can include one or more processors. Those processors can be disposed within one or more of the frame or the one or more stems. In one embodiment, the eyewear further includes one or more proximity sensor components that are operable with the one or more processors. In one embodiment, the one or more proximity sensor components each comprise a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one embodiment the proximity sensor component comprises a signal receiver to receive signals from objects external to the frame and stems of the eyewear. In one embodiment, the signal receiver is an infrared signal receiver to receive an infrared emission from an object, such as a human being, when the object is within a thermal reception radius of the eyewear. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of an active proximity detector component that includes a transmitter and receiver pair.

In one or more embodiments, the one or more proximity sensor components are disposed within the stems of the eyewear. Embodiments of the disclosure contemplate that people have a limited field of view when it comes to vision. Accordingly, when wearing eyewear, the person can generally see in a forward direction, e.g., through the lenses disposed in the frame, at an angle of between 120 and 180 degrees. However, the person cannot see "through the back of their head." Accordingly, strategic positioning of the proximity sensor components allows these devices to detect objects approaching from behind.

In one or more embodiments, either the eyewear or a companion electronic device, such as a smartphone, can execute a control operation when an object is detected by the one or more proximity sensor components detect the presence of the object. As will be described in more detail below, the control operation can take many different forms. For example, in one embodiment the control operation comprises delivering an alert to a user. The alert can notify the user that someone is behind them. In one or more embodiments, this alert can include an indication of the direction of the location of the person as well. The alerts can take many different forms, from the benign alert indicating that the person should walk faster, to the more serious indicating that the person may be in danger because someone is rapidly approaching from behind.

In one embodiment, to provide more optimal detection of objects from behind a user wearing the eyewear, the one or more proximity sensor components are disposed at the distal end of the stems away from the frame of the eyewear. In one embodiment, each stem comprises a temple portion and an ear engagement portion. The temple portion is disposed between the ear engagement portion and the frame. In one embodiment, the one or more proximity sensor components are disposed along the ear engagement portion to have the best rearward facing "field of view" behind the user. Where so disposed, the infrared signal receivers of the proximity sensor components are in a position to receive infrared or thermal emissions from objects along the rearward facing direction.

In one embodiment, the eyewear comprises two stems, namely, a first stem and a second stem. In one embodiment, one proximity sensor component is disposed in the ear engagement portion of each stem. For example, in one embodiment a first proximity sensor component can be disposed along the first stem, while a second proximity sensor component is disposed along a second stem. These locations can be advantageous in that they reduce the possibility of hair completely covering each proximity sensor component. These locations also provide for an ergonomic design to make sure rearward facing reception blockage of the proximity sensor components can be avoided.

Where two or more such proximity sensor components are used, a determination of direction from which an infrared emission was received can be made. For instance, the first proximity sensor component can define at least a first reception beam oriented at least partially in a first direction, while the second proximity sensor component defines at least a second reception beam oriented at least partially in a second direction. The first direction and the second direction can be different. By determining which proximity sensor component receives an infrared emission, an indication of from which direction the infrared emission was received can be obtained. Moreover, as will be described in more detail below, grills and/or lenses can be used to define multiple thermal reception beams to further enhance the determination of direction. Each thermal reception beam can have associated therewith a reception angle. In one embodiment, each reception angle is obtuse, i.e., greater than ninety degrees, such that the reception angle of one proximity sensor component overlaps the reception angle of the other proximity sensor component.

In one or more embodiments, a photovoltaic device, such as a solar cell, can be included in the eyewear to charge a small energy storage device, such as a rechargeable battery. Simulations show that a group of infrared signal receivers can operate with a total current drain of just a few microamps. Accordingly, a small photovoltaic device disposed along one or both temple portions is sufficient to power the one or more processors, the proximity sensor components, and optionally a wireless communication device. In other embodiments, energy harvesting engines such as piezo devices that generate power from the mechanical movement of a person wearing the eyewear can be used to power these components.

Embodiments of the disclosure can be used in a variety of ways. For example, in one embodiment when a proximity sensor component detects an object to the rear of a user, a control operation can include delivering an alert to the user. This alert can be in the form of a haptic response in one embodiment, e.g., a tiny vibration delivered to the side of the user's head. The alert can be an audible output in other embodiments, e.g., a low-volume sound delivered behind the user's ear. In one or more embodiments, the audible output can even indicate direction. For example, an audible output delivered to the right ear may indicate a person is approaching from the right, while an audible output delivered to the left ear may indicate the opposite. Of course, combinations of these approaches can be used as well. Still other alert types will be described below, while yet even others will be obvious to those of ordinary skill in the art having the benefit of this disclosure.

In another embodiment, to increase the user's alertness when people are approaching and/or standing behind, the eyewear can include a wireless communication device to transmit a notification to a companion electronic device when the one or more proximity sensor components receive the infrared emission from the object. One or more processors in the other electronic device can then execute a control operation when the it receives the notification. For example, if the companion device is a smartphone, the control operation might include limiting "viewability" of the display when the one or more proximity sensor components indicate presence behind a user. In another embodiment, the companion device may send notifications and alerts to a remote server across a network, i.e., a server "in the cloud," when someone is behind a user.

In yet another embodiment, the companion device may "lock" itself to prevent the user from using it temporarily so that they are both notified of the presence behind them and are able to direct their attention to the object rather than their electronic device. If the eyewear is equipped with an audio capture device and/or a video capture device, these devices can be actuated to capture audio and/or video when a person is behind the user. If the person is a criminal intending to attack the user, this captured video and/or audio can be transmitted to emergency personnel for later identification of the criminal. Other uses and benefits of embodiments described herein will be obvious to those of ordinary skill in the art having the benefit of this disclosure.

Turning now to FIG. 1, illustrated therein is one explanatory embodiment of eyewear 100 in accordance with one or more embodiments of the disclosure. The illustrative eyewear 100 of FIG. 1 is configured as a pair of eyeglasses. However, this is for explanatory purposes only, as the eyewear 100 could be configured in any number of other ways as well. As noted above, the eyewear 100 could also be configured as any of sunglasses, goggles, masks, shields, or visors. Other forms of eyewear 100 will be obvious to those of ordinary skill in the art having the benefit of this disclosure.

The eyewear 100 of FIG. 1 includes a frame 101 and one or more stems 102,103. Here, the one or more stems 102,103 comprise a first stem 102 and a second stem 103. One or more lenses 104,105 can be disposed within the frame 101. The lenses 104,105 can be prescription or non-prescription, and can be clear, tinted, or dark. In this illustrative embodiment, the stems 102,103 are pivotable 106 from a first position 107 to a second, radially displaced open position shown in FIG. 1. However, in other embodiments the stems 102,103 may be fixed relative to the frame 101. In still other embodiments, such as might be the case if the eyewear 100 were goggles, the stems 102,103 may be flexible or soft. For example, the stems of goggles are frequently elasticized fabric, which is soft, flexible, pliable, and stretchy. Other types of stems 102,103 will be obvious to those of ordinary skill in the art having the benefit of this disclosure.

In one or more embodiments the stems 102,103 attach to the frame 101 at a first end 108,109 and extend distally from the frame 101 to a second, distal end 110,111. In one embodiment, each stem 102,103 includes a temple portion 112 and an ear engagement portion 113. The temple portion 112 is the portion of the stem 102,103 passing from the frame 101 past the temple of a wearer, while the ear engagement portion 113 engages the wearer's ear to retain the eyewear to the wearer's head.

In one or more embodiments, the eyewear 100 is configured as an electronic device. Accordingly, one or both of the frame 101 and the stems 102,103 can comprise one or more electrical components. These electrical components are shown illustratively in a schematic block diagram 115 in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 116. The one or more processors 116 can be disposed in one or both of the stems 102,103 or the frame 101. The one or more processors 116 can be operable with a memory 118. The one or more processors 116, which may be any of one or more microprocessors, programmable logic, application specific integrated circuit device, or other similar device, are capable of executing program instructions and methods described herein. The program instructions and methods may be stored either on-board in the one or more processors 116, or in the memory 118, or in other computer readable media coupled to the one or more processors 116. The one or more processors 116 can be configured to operate the various functions of the eyewear 100, and also to execute software or firmware applications and modules that can be stored in a computer readable medium, such as memory 118. The one or more processors 116 execute this software or firmware, in part, to provide device functionality. The memory 118 may include either or both static and dynamic memory components, may be used for storing both embedded code and user data.

In one embodiment, one or more proximity sensor components 119 can be operable with the one or more processors 116. The one or more proximity sensor components 119 can be disposed within the one or more stems 102,103. In one embodiment, the proximity sensor components 119 comprise only signal receivers. In one embodiment, the proximity sensor components 119 comprise infrared signal receivers 117, such as infrared photodiodes. For example, in one embodiment the proximity sensor components 119 comprise signal receivers that receive infrared wavelengths of about 860 nanometers. In one embodiment, the proximity sensor components 119 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

In one embodiment, each proximity sensor component 119 comprises an infrared signal receiver so as to be able to detect infrared emissions from a person. This is sometimes referred to as a "passive IR system" due to the fact that the person is the active transmitter. Accordingly, the proximity sensor component 119 requires no transmitter since objects disposed external to the housing deliver emissions that are received by the infrared signal receiver 117. As no transmitter is required, each proximity sensor component 119 can operate at a very low power level. Simulations show that a group of infrared signal receivers can operate with a total current drain of just a few microamps, such as less than about eight microamps.

In one embodiment, the signal receiver of each proximity sensor component 119 can operate at various sensitivity levels so as to cause the at least one proximity sensor component 119 to be operable to receive the infrared emissions from different distances. For example, the one or more processors 116 can cause each proximity sensor component 119 to operate at a first "effective" sensitivity so as to receive infrared emissions from a first distance. Similarly, the one or more processors 116 can cause each proximity sensor component 119 to operate at a second sensitivity, which is less than the first sensitivity, so as to receive infrared emissions from a second distance, which is less than the first distance. The sensitivity change can be effected by causing the one or more processors 116 to interpret readings from the proximity sensor component 119 differently.

In this illustrative embodiment, the one or more proximity sensor components 119 comprise a first proximity sensor component 120 disposed along the first stem 102 and a second proximity sensor component 121 disposed along a second stem 103. In one embodiment, the first proximity sensor component 120 and the second proximity sensor component 121 are each disposed along the ear engagement portion 113 of the first stem 102 and the second stem 103, respectively, toward the distal end 110,111 of the first stem 102 and the second stem 103. As noted above, in one embodiment the stems 102,103 extend distally from the frame 101 in a rearward facing direction 114 when in the open position shown in FIG. 1. This allows the infrared signal receiver 117 of each proximity sensor component 119 to receive one or more infrared emissions from object along the rearward facing direction 114.

In one or more embodiments, the eyewear 100 also includes an optional wireless communication device 125. Where included, the wireless communication device 125 is operable with the one or more processors 116, and is used to facilitate electronic communication with one or more electronic devices or servers or other communication devices across a network. Note that it is possible to combine the one or more processors 116, the memory 118, and the wireless communication device 125 into a single device, or alternatively into devices having fewer parts while retaining the functionality of the constituent parts.

The wireless communication device 125, which may be one of a receiver or transmitter, and may alternatively be a transceiver, operates in conjunction with the one or more processors 116 to electronically communicate through a communication network. For example, in one embodiment, the wireless communication device 125 can configured to communicate through a traditional cellular network, such as a Code Division Multiple Access (CDMA) network or Global System for Mobile communication (GSM) network. Other examples of networks with which the communication circuit may communicate include Push-to-Talk (PTT) networks, proprietary networks, dual band CDMA networks, or Dual Band Universal Mobile Telecommunications System (UMTS) networks, and direct communication networks. In other embodiments, the wireless communication device 125 can communicate with near field or local area networks. Examples of suitable near field communication circuits include Bluetooth communication circuits, IEEE 801.11 communication circuits, infrared communication circuits, magnetic field modulation circuits, and Wi-Fi circuits. In one or more embodiments, the wireless communication device 125 can be configured to provide messaging functionality to deliver electronic messages to remote devices.

A battery 122 or other energy storage device can be included to provide power for the various components of the eyewear 100. While a battery 122 is shown in FIG. 1, it will be obvious to those of ordinary skill in the art having the benefit of this disclosure that other energy storage devices can be used instead of the battery 122, including a micro fuel cell or an electrochemical capacitor. The battery 122 can include a lithium ion cell or a nickel metal hydride cell, such cells having sufficient energy capacity, wide operating temperature range, large number of charging cycles, and long useful life. The battery 122 may also include overvoltage and overcurrent protection and charging circuitry. In one embodiment, the battery 122 comprises a small, lithium polymer cell.

In one or more embodiments, a photovoltaic device 123, such as a solar cell, can be included to recharge the battery 122. In one embodiment, the photovoltaic device 123 can be disposed along the temple portion 112 of the stems 102,103. In this illustrative embodiment, two solar cells 126,127 are disposed in the temple portion 112 of each stem 102,103, respectively.

Other components 124 can be optionally included in the eyewear 100 as well. For example, in one embodiment one or more microphones can be included as audio capture devices 128. These audio capture devices can be operable with the one or more processors 116 to receive voice input. Additionally, in one or more embodiments the audio capture device 128 can capture ambient audio noise when the proximity sensor components 119 detect someone behind a user of the eyewear 100. In one or more embodiments, if the person behind the user turns out to be a threat, the one or more processors 116 can transmit this captured audio to emergency personnel for later identification. In one or more embodiments, the audio capture device 128 can record audio to the memory 118 for transmission through the wireless communication device 125 to a server complex across a network.

The other components 124 can also include a motion generation device for providing haptic notifications or vibration notifications to a user. For example, a piezoelectric transducer, rotational motor, or other electromechanical device can be configured to impart a force or vibration upon the temple portion 112 of the stems 102,103, or alternatively along the frame 101. The motion generation device can provide a thump, bump, vibration, or other physical sensation to the user. The one or more processors 116 can be configured to actuate the motion generation device to deliver a tactile or vibration output alone or in combination with other outputs such as audible outputs.

Similarly, in one or more embodiments the eyewear can include a video capture device 129 such as an imager. The imager can be disposed within the stems 102,103 so as to be able to capture images along the rearward facing direction 114 when the proximity sensor components 119 detect the presence of an object within the thermal reception radius of the proximity sensor components 119. In one or more embodiments, the video capture device can function as a to detect changes in optical intensity, color, light, or shadow in the near vicinity of the eyewear 100 along the rearward facing direction 114. As with the audio capture device 128, captured video information can be transmitted to emergency personnel in the event that the object detected by the proximity sensor components turns out to be a threat.

Other optional components include a global positioning system device 130 for determining where the eyewear 100 is located. The global positioning system device 130 can communicate with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. While a global positioning system device 130 is one example of a location determination module, it will be clear to those of ordinary skill in the art having the benefit of this disclosure that other location determination devices, such as electronic compasses or gyroscopes, could be used as well.

An optional user interface 131 can be included. The user interface 131 can be used, for example, to active the circuit components or turn them OFF, control sensitivity of the proximity sensor components, and so forth. The user interface 131, where included, can be operable with the one or more processors 116 to deliver information to, and receive information from, a user. The user interface 131 can include a rocker switch, slider pad, button, touch-sensitive surface, or other controls, and optionally a voice command interface. These various components can be integrated together.

In one or more embodiments, an audio output device 132, such as a loudspeaker or other transducer, can deliver audio output to a user. For example, piezoelectric transducers can be operably disposed within the stems 102,103. Actuation of the piezoelectric transducers can cause the stems 102,103 to vibrate, thereby emitting acoustic output. More traditional audio output devices 132, such as loudspeakers, can be used as well.

A haptic device 133 can be included for providing haptic feedback to a user. The haptic device 133 can include a motion generation device to deliver a tactile response to the user. For example, a piezoelectric transducer or other electromechanical device can be included in the stems 102,103. The transducer can actuate to impart a force upon the user's head to provide a thump, bump, vibration, or other physical sensation to the user. The inclusion of both the audio output device 132 and the haptic device 133 allows both audible and tactile feedback to be delivered when the proximity sensor components 119 detect an object within a thermal detection radius.

Figure 2:
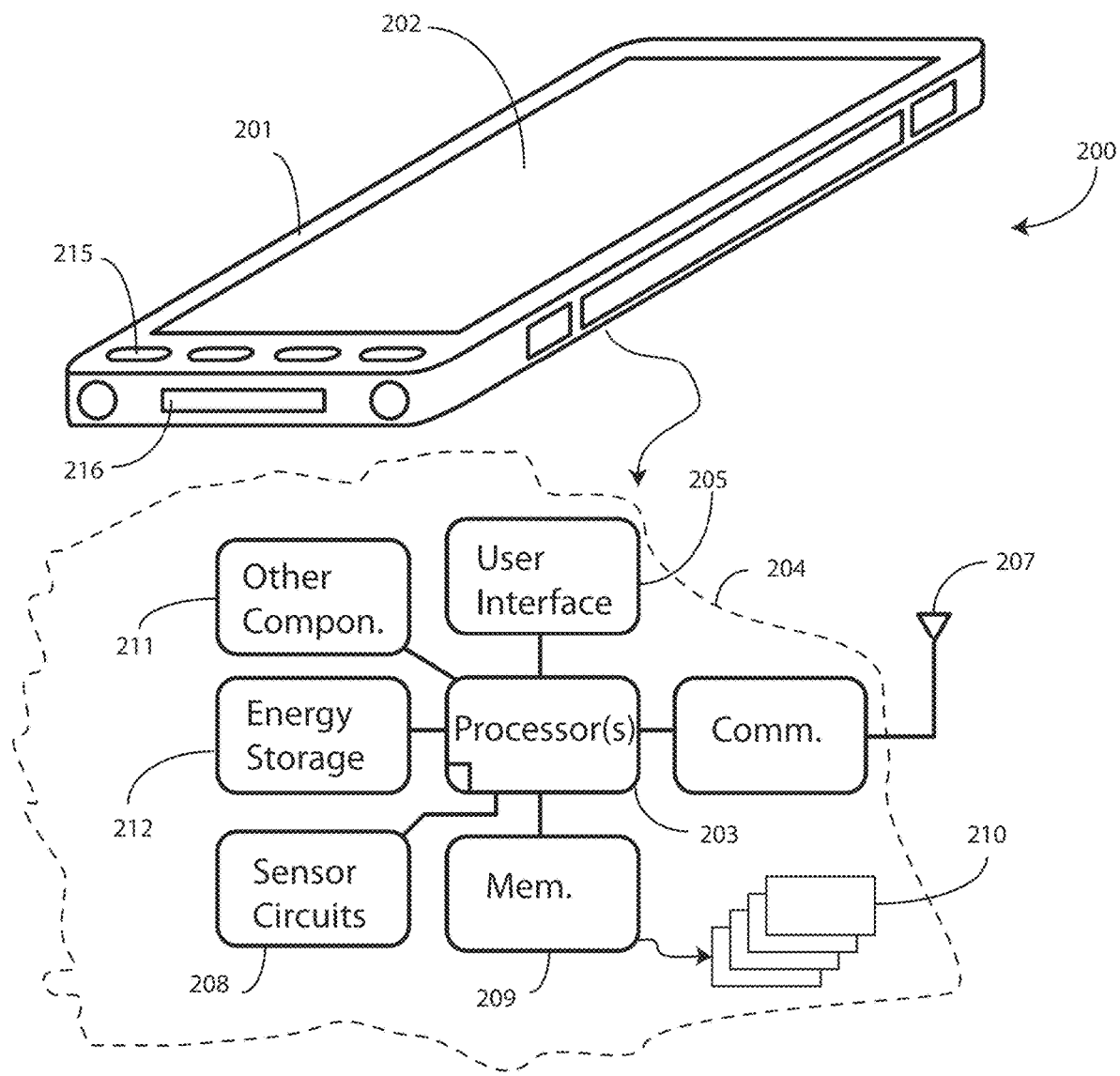
FIG. 2 illustrates an explanatory electronic device in accordance with one or more embodiments of the disclosure.

The eyewear 100 of FIG. 1 can operate as a stand-alone electronic device in one or more embodiments. However, in other embodiments, the eyewear 100 can operate in tandem with a companion electronic device to form an eyewear system. Turning now to FIG. 2, illustrated therein is one such electronic device 200.

The electronic device 200 of FIG. 2 is a portable electronic device, and is shown as a smart phone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 202, which may optionally be touch-sensitive. The display 202 can serve as one component of the overall user interface 205 of the electronic device 200. Users can deliver user input to the display 202 or user interface 205.

The explanatory electronic device 200 of FIG. 2 also includes a housing 201. In one embodiment, the housing 201 includes two housing members, namely a front housing member disposed about the periphery of the display 202 and a rear-housing member disposed about the backside of the electronic device 200. Features can be incorporated into the housing 201, including control devices 215, connectors 216, and so forth.

A block diagram schematic 204 of the electronic device 200 is also shown. In one embodiment, the electronic device 200 includes one or more processors 203. The one or more processors 203 can include an application processor and, optionally, one or more auxiliary processors. These can be a microprocessor, a group of processing components, one or more ASICs, programmable logic, or other type of processing device. The one or more processors 203 can be configured to process and execute executable software code to perform the various functions of the electronic device 200. A storage device, such as memory 209, can optionally store the executable software code used by the one or more processors 203 during operation.

In this illustrative embodiment, the electronic device 200 also includes a wireless communication device 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The wireless communication device 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The wireless communication device 206 can include wireless communication circuitry, one of a receiver, a transmitter, or transceiver, and one or more antennas 207.

In one embodiment, the one or more processors 203 can be responsible for performing the primary functions of the electronic device 200. For example, in one embodiment the one or more processors 203 can present information to a user on the display 202. The executable software code used by the one or more processors 203 can be configured as one or more modules 210 that are operable with the one or more processors 203. Such modules 210 can store instructions, control algorithms, and so forth.

The electronic device 200 can also include one or more sensor circuits 208. These sensor circuits 208 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The sensor circuits 208 can also include surface/housing capacitive sensors, audio sensors, and video sensors (such as a camera). The sensor circuits 208 can also include motion detectors, such as an accelerometer or a gyroscope.

Other components 211 operable with the one or more processors 203 can include output components such as video, audio, and/or mechanical outputs. A battery 212 or other energy storage device can deliver power to operate the electronic device 200.

It is to be understood that in both FIG. 1 and FIG. 2, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 1, or may include a combination of two or more components or a division of a particular component into two or more separate components, and still be within the scope of the present disclosure.

Figure 3:
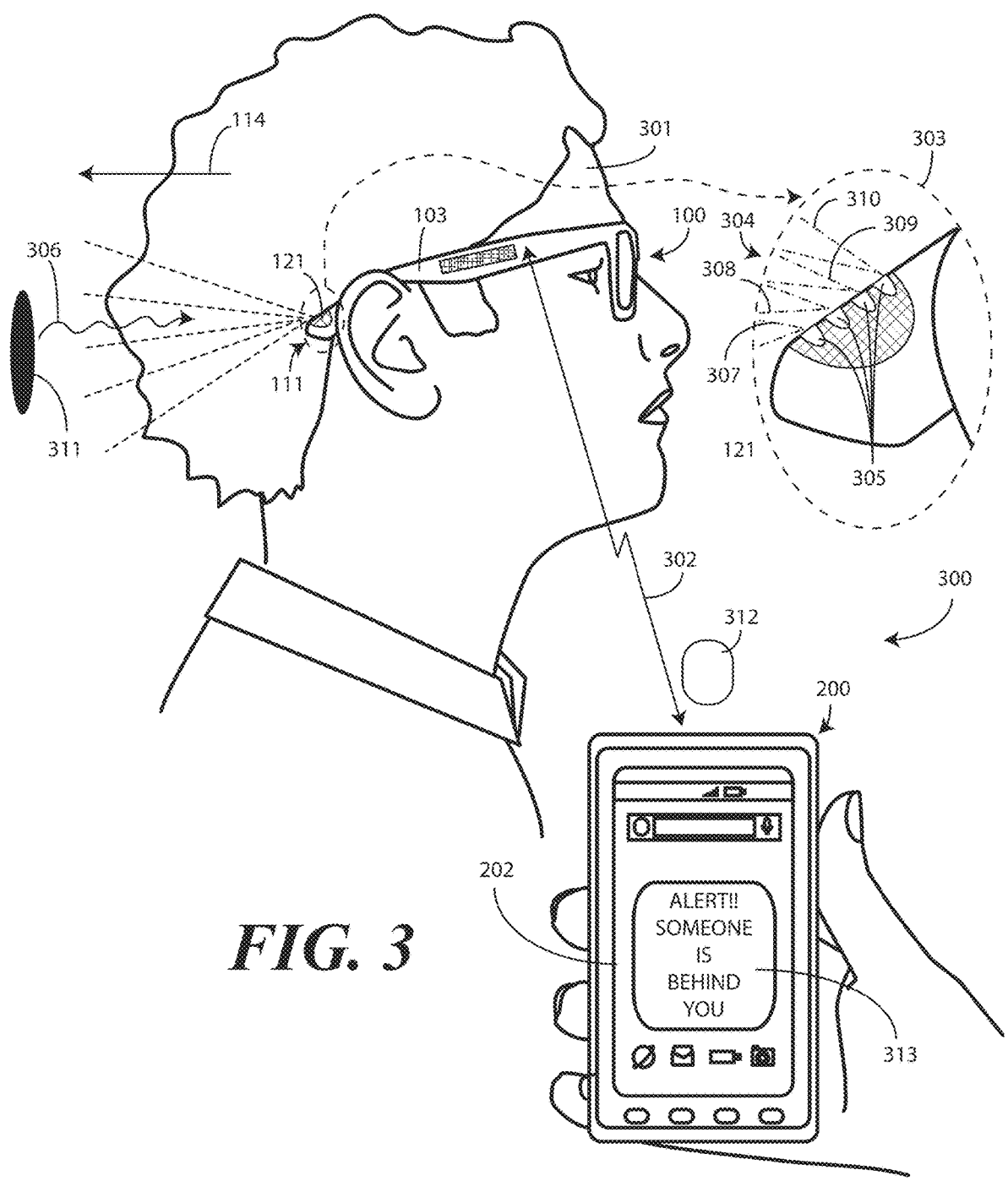
FIG. 3 illustrates a user wearing and operating explanatory eyewear in accordance with on or more embodiments of the disclosure.

Turning now to FIG. 3, illustrated therein is a user 301 wearing the eyewear 100 of FIG. 1. The eyewear 100 is in wireless communication 302 with the electronic device 200 of FIG. 20 to define an eyewear system 300.

In one or more embodiments, as shown in the close-up view 303 of the distal end 111 of the stem 103, each proximity sensor component 121 is disposed behind a grille 304 that defines one or more apertures 305 through which infrared emissions 306 are received. In one embodiment, the grille 304 can define one or more reception beams 307,308, 309,310 in which infrared emissions 306 can be received. The definition of such reception beams 307,308,309,310 advantageously can enable the proximity sensor components 121 to detect not only the location of an object relative to the eyewear 100, but also whether one or multiple objects are within a thermal detection radius. Embodiments of the disclosure contemplate that there is a high value in not only detecting presence or motion of an object within a thermal detection radius of the eyewear 100, but also in determining where the exact user position is relative to eyewear 100. The use of the grille 304 and its corresponding reception beams 307,308,309,310 allows for the detection of multiple people along the rearward facing direction 114, even when those people are close to one another. In one or more embodiments, the proximity sensor components 121 can also detect changes across reception beams 307,308,309,310 to detect motion as well.

In one embodiment, a lens can be disposed behind, outside, or integrally with the grille 304 to assist with the definition of the reception beams 307,308,309,310 and/or serve as a water dust seal. For example, a polycarbonate lens can be disposed behind the grille 304 and configured as a compound Fresnel lens with a predetermined number of slits, such as five or seven, to assist with the definition of the reception beams.

As previously described, in one or more embodiments when the proximity sensor component 121 receives the infrared emission 306 from an object 311, the one or more processors (116) of the eyewear 100 and/or the one or more processors (203) of the electronic device 200 can be configured to execute a control operation. In this illustrative embodiment, upon the proximity sensor component 121 receiving the infrared emission 306, the one or more processors (116) of the eyewear 100 have caused its wireless communication device (125) to transmit a notification 312 to the wireless communication device 206 of the electronic device 200. When this occurs, the one or more processors (203) of the electronic device execute a control operation when its wireless communication device (206) receives the notification 312. Here, the control operation comprises presenting a prompt 313 on the display 202 of the electronic device 200.

The prompt 313 can include various indicia. Here, for example, the prompt 313 says, "Alert! Someone is Behind You!" Accordingly, if the user 301 is reading a newsfeed while walking down the street, i.e., the user 301 is not paying attention to anything other than the electronic device 200, the prompt 313 would cause the user 301 to take notice of the person behind them. In another embodiment, for example if the electronic device 200 identifies a companion electronic device of the person behind the user 301 as their friend, Buster, the prompt 313 may say, "Surprise! Buster is right behind you!" In yet another embodiment, which may be useful on a crowded sidewalk, the prompt 313 may simply comprise an indication to walk or run faster, e.g., "Hurry up! People are behind you!." These examples are illustrative only, as others will be obvious to those of ordinary skill in the art having the benefit of this disclosure.

Figure 4:
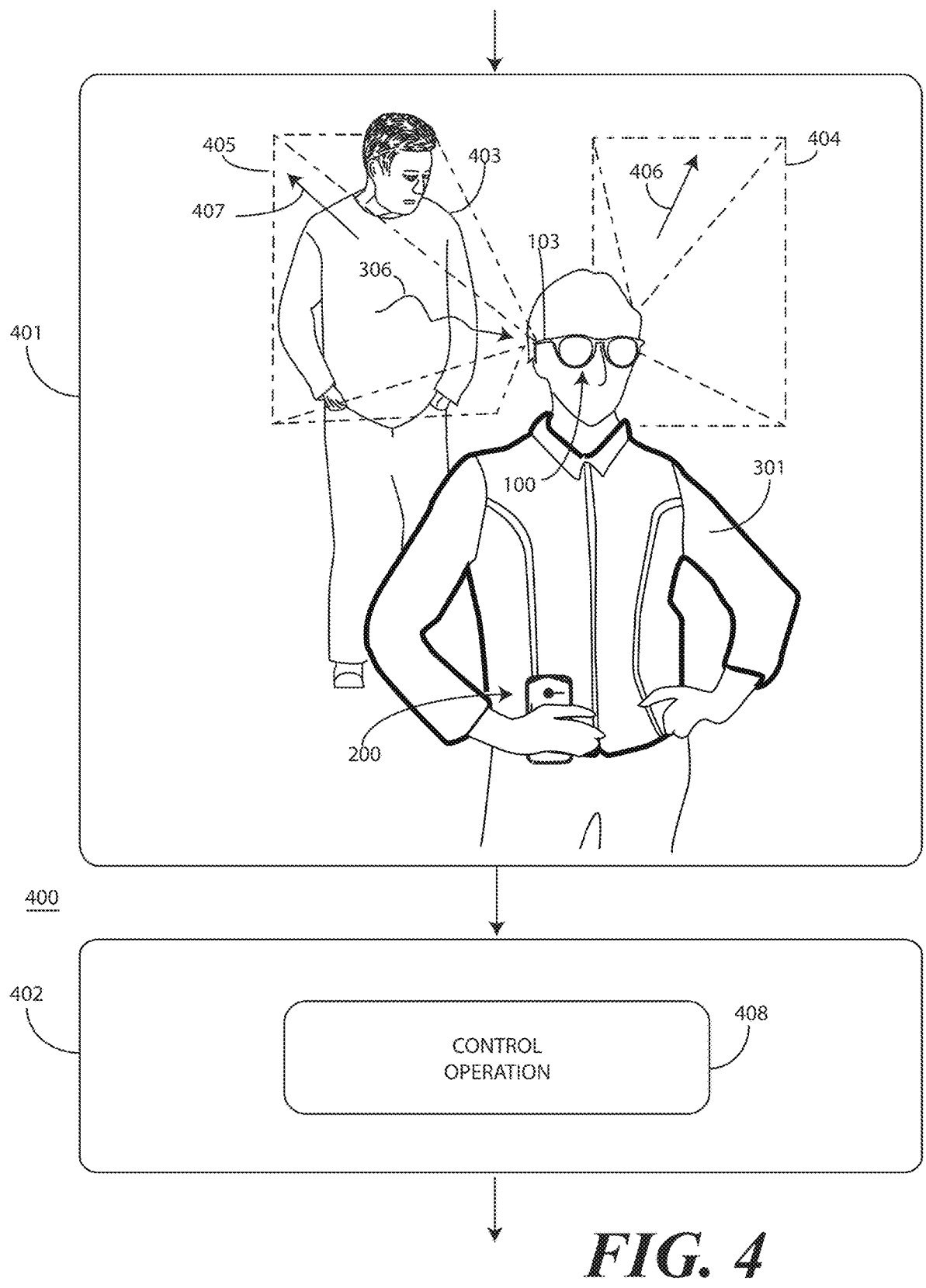
FIG. 4 illustrates an explanatory method using eyewear having proximity sensor components in accordance with one or more embodiments of the disclosure.

Turning now to FIG. 4, illustrated therein is one explanatory method 400 suitable for use with one or more embodiments of the disclosure. As shown at step 401, a user 301 is wearing eyewear 100 configured in accordance with one or more embodiments of the disclosure. The user 301 also has a companion electronic device 200. Note that this is optional, as the one or more processors (116) of the eyewear 100 can execute control operations without the electronic device 200, as will be shown in subsequent figures.

One or more proximity sensor components (120,121) are disposed within the one or more stems (102),103. Each proximity sensor component (120,121) comprises an infrared signal receiver (117) to receive an infrared emission 306 from an object such as the person 403 behind the user 301.

In this illustrative embodiment, the first proximity sensor component (120) disposed within the first stem 102 defines at least a first reception beam 404 oriented at least partially in a first direction 406. Similarly, the second proximity sensor component (121) defines at least a second reception beam 405 oriented at least partially in a second direction 407. Here, the second direction 407 is different from the first direction 406 so that the one or more processors (116) of the eyewear 100 can determine not only that the person 403 is behind the user 301, but where the person 403 is behind the user 301.

When this occurs, as shown at step 402, a control operation 408 can be executed. In one embodiment, the one or more processors (116) of the eyewear 100 execute the control operation 408. For example, where the eyewear 100 includes an audio output device (132), the control operation 408 can comprise causing the audio output device (132) to emit audible sound when the infrared signal receiver (117) of the proximity sensor component (121) receives the infrared emission 306 from the person 403. An example of this will be shown in FIG. 5.

In another embodiment, where the eyewear 100 includes a haptic device (133), the control operation 408 can comprise causing the haptic device (133) to deliver a tactile output when the infrared signal receiver (117) of the proximity sensor component (121) receives the infrared emission 306 from the person 403. An example of this will be shown in FIG. 6.

In yet another embodiment, as was shown in FIG. 3 above, the control operation 408 can comprise causing the wireless communication device (125) of the eyewear 100 to transmit a notification (312) to the companion electronic device 200 when the infrared signal receiver (117) of the proximity sensor component (121) receives the infrared emission 306 from the person 403. In this illustrative embodiment, the infrared emission 306 is being received along the second reception beam 405 and not the first reception beam 404. Accordingly, the one or more processors (116) of the eyewear 100 can determine a direction of the person 403. As such, the notification (312) can include an indication of whether the infrared emission 306 was received from the first reception beam 404 or the second reception beam 405. The electronic device 200 can use this information, for example, in providing a prompt (313) on the display (202) of the electronic device 200 to let the user 301 know to look over their right shoulder rather than the left.

In other embodiments, the one or more processors (203) of the electronic device 200 can also execute a control operation 408. In one embodiment, the one or more processors (203) of the electronic device 200 can execute a control operation 408 by locking the electronic device 200. This action may force the user 301 to look up rather than at the electronic device 200 since the display (202) of the electronic device 200 is OFF. In another embodiment, the control operation 408 can comprise at least partially limiting visibility of information presented on the display (202) of the electronic device 200, which can have the same effect. Where direction from which the infrared emission 306 is received is known, the control operation 408 can include presenting an indication of a direction from which the infrared emission was received in a prompt (313) on the display. In yet another embodiment, the control operation 408 can comprise transmitting one or more notification messages to a server across a network.

Other control operations 408 can be executed by either or both of the one or more processors (116) of the eyewear 100 or the one or more processors (203) of the electronic device 200. Embodiments of the disclosure contemplate that the person 403 behind the user 301 could be a threat, thereby putting the user 301 in danger. Embodiments of the disclosure contemplate that emergency situations frequently arise with a bit of surprise and without warning. Since safety is a paramount concern, the control operation 408 can be safety-related. For example, in one embodiment the control operation 408 can include deactivating the display (202) of the electronic device 200. This causes the display (202) to effectively turn blank.

In another embodiment, the control operation 408 can comprise deactivating the user interface (205) of the electronic device 200. This causes the electronic device 200 to be non-responsive to any key actions. The combination of deactivation of the display (202) and deactivation of the user interface (205) makes the electronic device 200 look as if the battery (212) died to the person 403 behind, who may be an attacker. Moreover, the latter works to ensure that the electronic device 200 cannot be turned OFF using conventional techniques.

In one embodiment, the control operation 408 can include causing the transmission of location information to a server complex when the person 403 is detected behind the user 301. In one embodiment, the control operation 408 can include terminating one or more active applications and/or or otherwise turning off non-essential services running on the electronic device to conserve energy stored in the battery (212).

Where the electronic device 200 and/or eyewear includes an audio recording or capture device or a video recording or capture device, the control operation 408 can include activating these devices when the person 403 is detected behind the user 301. Audio recordings can be stored in the memory (118,209) to create a virtual "black box" to capture recordings of what is happening in the surrounding environment. Captured audio or video can be sent to a server complex or to emergency personnel. Other control operations 408 will be obvious to those of ordinary skill in the art having the benefit of this disclosure.

Now that a fundamental understanding of the eyewear 100 and eyewear system (300) has been explained, a few of the possible control operations 408 will be illustrated in more detail in FIGS. 5-10 below. Beginning with FIG. 5, here the eyewear 100 is equipped with a haptic device (133). When the one or more proximity sensor components (119) receive the infrared emission 306 from the object 311, the one or more processors (116) operable to execute a control operation 408. In this embodiment, the control operation 408 comprises causing the haptic device (133) to deliver a tactile output 501 when the infrared signal receiver (117) of the one or more proximity sensor component (119) receives the infrared emission 306 from the object 311.

In one embodiment, the tactile output 501 is a function of the distance that the object 311 is located behind the eyewear 100. For example, when the object 311 is ten feet away, the tactile output 501 may be a light tap. However, when the object is two feet away, the tactile output 501 may be a large thump.

Figure 6:
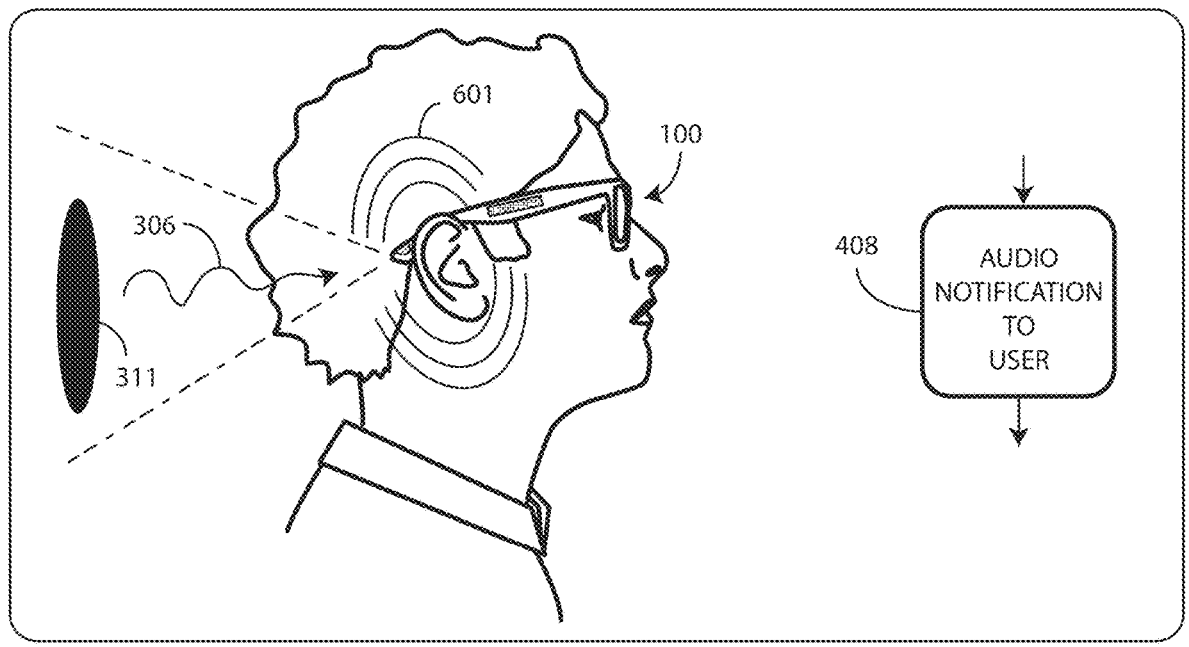
FIG. 6 illustrates one or more other explanatory control operations associated with explanatory eyewear incorporating proximity sensor components in accordance with one or more embodiments of the disclosure.

Turning now to FIG. 6, here the eyewear 100 is equipped with a audio output device (132). As before, when the one or more proximity sensor components (119) receive the infrared emission 306 from the object 311, the one or more processors (116) operable to execute a control operation 408. In this embodiment, the control operation 408 comprises causing the audio output device (132) to emit audible sound 601 when the infrared signal receiver (117) of the one or more proximity sensor component (119) receives the infrared emission 306 from the object 311.

In one embodiment, the audible sound 601 is emitted is a function of the distance that the object 311 is located behind the eyewear 100. For example, when the object 311 is ten feet away, the audible sound 601 may be a light beep. However, when the object is two feet away, the audible sound 601 may be a loud noise. In one or more embodiments, the audible sound 601 can comprise speech as well. For example, the audible sound 601 may comprise a message, such as "Look out! Someone is right behind you."

Figure 5:
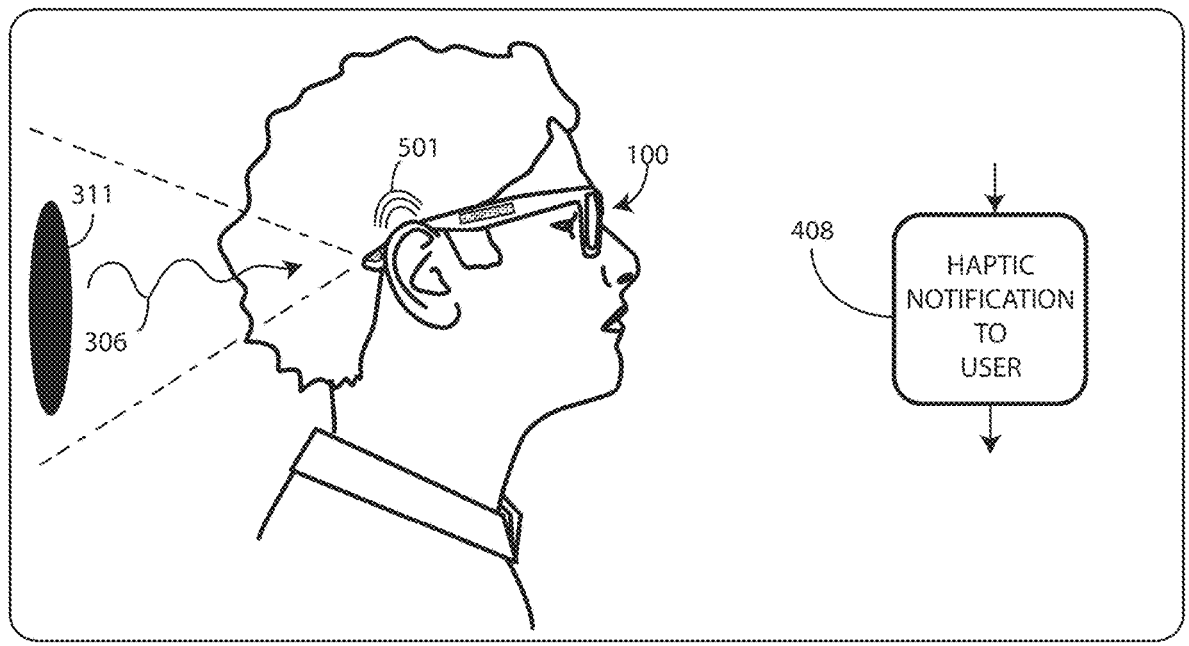
FIG. 5 illustrates one or more explanatory control operations associated with explanatory eyewear incorporating proximity sensor components in accordance with one or more embodiments of the disclosure.
Figure 7:
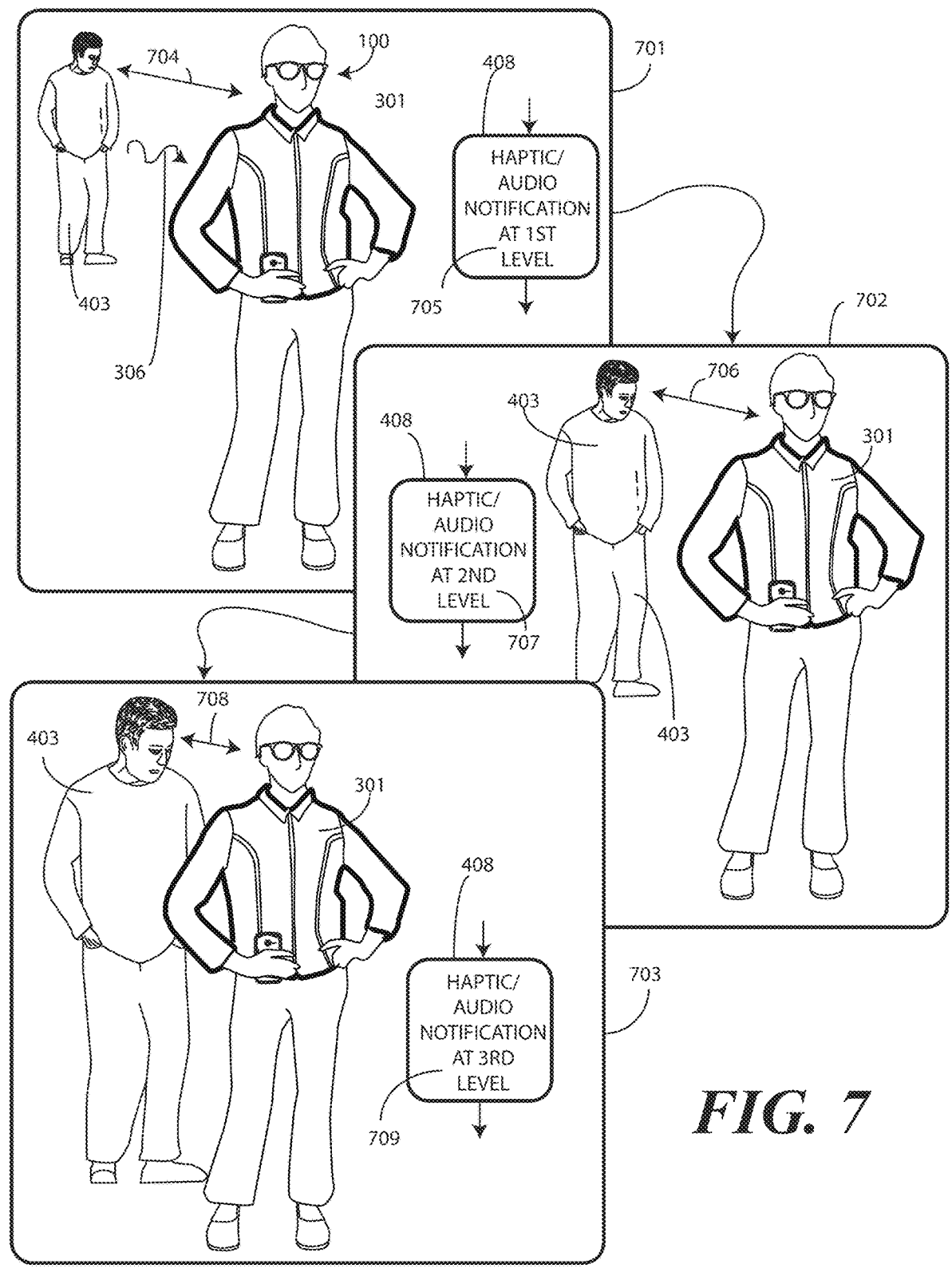
FIG. 7 illustrates still more explanatory control operations associated with explanatory eyewear incorporating proximity sensor components in accordance with one or more embodiments of the disclosure.

Turning now to FIG. 7, illustrated therein is how either the tactile output (501) of FIG. 5 or the audible sound (601) of FIG. 6 can change as a function of distance. In one or more embodiments, by detecting the strength of received infrared emissions (for stationary person or moving person), the one or more processors (116) of the eyewear 100 can determine one or more of the distance 704 a person may be from the eyewear 100 and/or a more precise location of that person. When a person 403 is located closer to a particular proximity sensor component (121) infrared emissions 306 received by proximity sensor component toward the person 403 will be stronger than other infrared emissions 604 received by the other proximity sensor component (120). Using this information, the one or more processors (116) can determine more precisely the location of the person 403. Additionally, the strength of the infrared emissions received by each proximity sensor component (120,121) can be used to determine the distance 704 the person 403 is from the eyewear 100 as well.

In FIG. 7, this information is used to deliver notifications to the user 301 as a function of distance 704 and/or location. Illustrating by example, at step 701, the person 403 is a relatively far distance, e.g., ten or more feet, from the user 301 wearing the eyewear 100. Accordingly, the control operation 408 comprises delivering either a tactile output (501) or audible sound (601) at a first level 705 that is a function of the distance 704.

At step 702, the person 403 is a second distance 706 from the user 301. In this case, distance 706 is less than distance 704. For example, distance 706 may be about five feet. The control operation 408 now comprises delivering either an increased tactile output (501) or audible sound (601) at a second level 707 that is a function of the decreased distance 706. Here, the second level 707 is greater than the first level 705.

At step 703, the person 403 is right behind the user 301. The control operation 408 now comprises delivering either a further increased tactile output (501) or audible sound (601) at a third level 709 that is a function of the relatively short distance 708, e.g., two feet or less. Here the third level 709 is greater than both the first level 705 and the second level 707.

Figure 8:
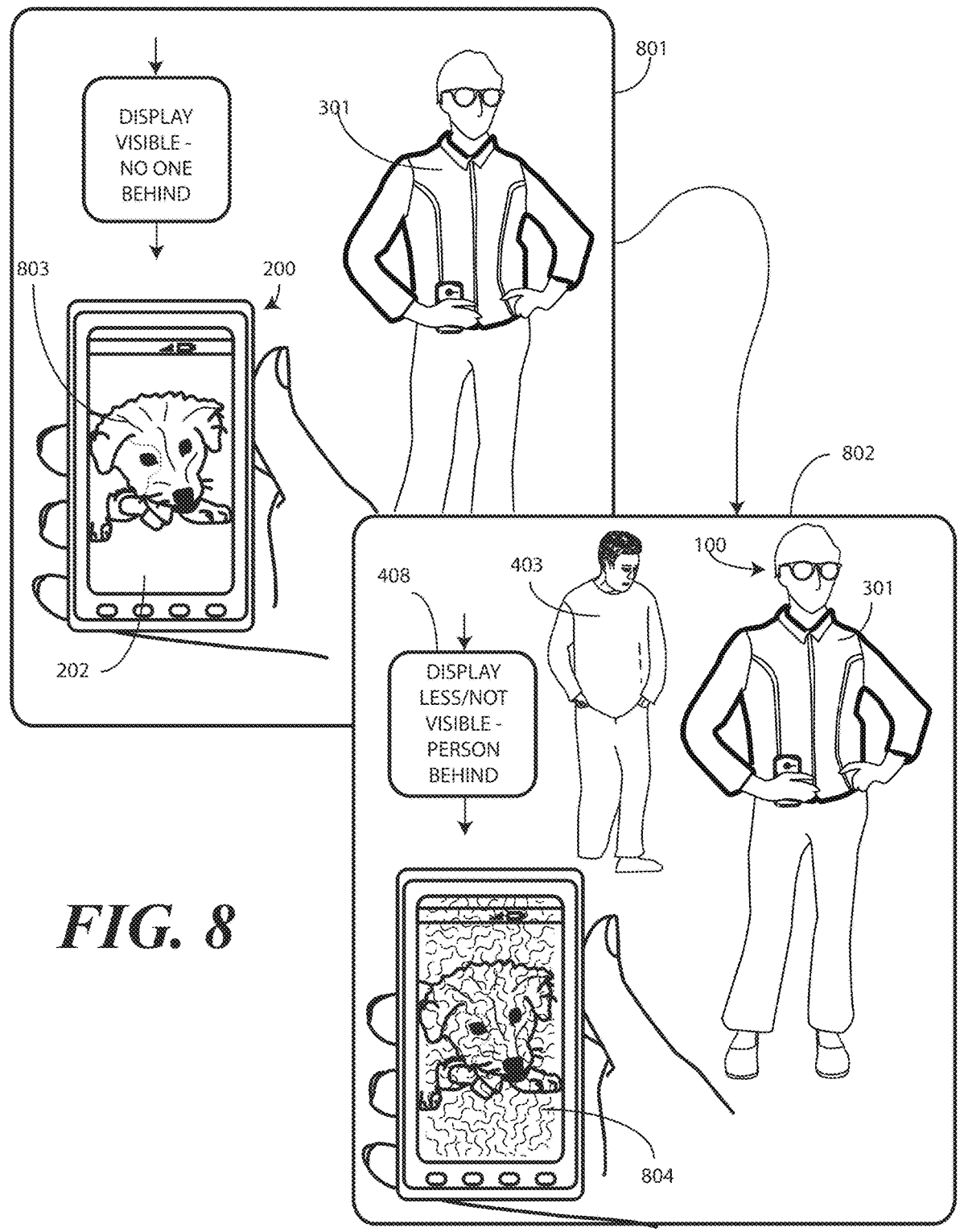
FIG. 8 also illustrates one or more explanatory control operations associated with explanatory eyewear incorporating proximity sensor components in accordance with one or more embodiments of the disclosure.

Turning now to FIG. 8, illustrated therein is a method of executing a control operation 408 on the electronic device 200 in response to the proximity sensor components (120, 121) of the eyewear 100 detecting a person 403 behind a user 301. At step 801, no one is behind the user 301. Accordingly, the electronic device 200 is operating normally. The user 301 is able to look at a photograph 803 of her dog, Buster, on the display 202.

At step 802, a person 403 is detected behind the user 301 by the proximity sensor components (120,121). In this embodiment, the wireless communication device (125) of the eyewear 100 transmits a notification (312) to the electronic device 200 when the infrared signal receiver (117) of the proximity sensor component (121) receives the infrared emission 306 from the person 403. The control operation 408 of step 802 is that of the one or more processors (203) of the electronic device 200 at least partially limiting visibility of information presented on the display 202. Here, the one or more processors (203) of the electronic device 200 have presented an obscuring graphic 804 over the photograph 803 of Buster. This alerts the user 301 that someone is behind her and that she should be paying attention to them rather than the electronic device 200. Of course, the one or more processors (203) of the electronic device 200 could just turn off the electronic device 200 as well.

Figure 9:
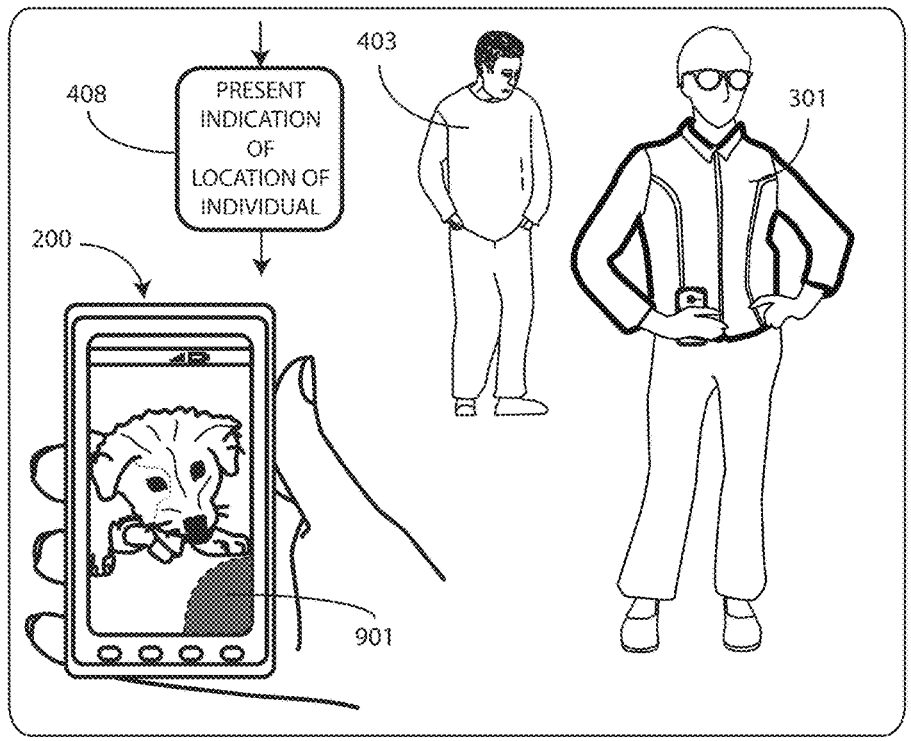
FIG. 9 illustrates one or more explanatory control operations associated with explanatory eyewear incorporating proximity sensor components in accordance with one or more embodiments of the disclosure.

Turning to FIG. 9, here the control operation 408 comprises presenting an indication 901 on the display 202 of the electronic device 200 from which the infrared emission was received to show a location of a person 403 behind the user 301. As noted above, in one or more embodiments the proximity sensor components (120,121) can determine direction by detecting which proximity sensor component (120,121) or reception beam (307,308,309,310) receives the strongest infrared emission. The electronic device 200 of FIG. 9 is equipped with an application that is configured to present an indication 901 on the display 202 showing where the person 403 is, which in this case is behind and to the right.

The indication 901 can change based upon location as well. For example, when the person 403 comes closer, the indication 901 on the display 202 can grow larger. Other techniques can be used as well. When the person 403 comes closer, the indication 901 on the display 202 can also grow darker. Note that the indication 901 in this illustrative example is presented on the display 202 in a corner corresponding to where the person 403 is relative to the user 301. Thus, if the person 403 moved closer to user's left, its corresponding indication 901 might move as well.

Figure 10:
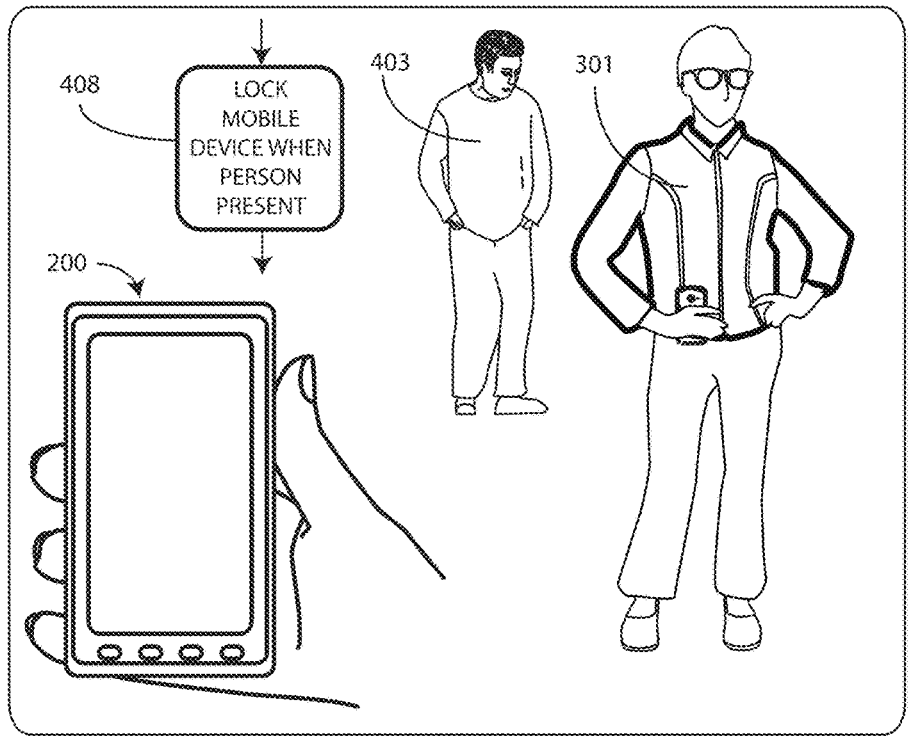
FIG. 10 illustrates one or more explanatory control operations associated with explanatory eyewear incorporating proximity sensor components in accordance with one or more embodiments of the disclosure.

Turning now to FIG. 10, illustrated therein is one additional control operation 408. Here, when a person 403 is detected behind the user 301 by the proximity sensor components (120,121), the one or more processors (203) of the electronic device 200 simply execute a control operation 408 locking the electronic device 200. As with previous embodiments, this control operation 408 alerts the user 301 that someone is behind her and that she should be paying attention to them rather than the electronic device 200.

As noted above, the illustrative control operations 408 of FIGS. 4-10 are simply offered to demonstrate the multitude of control operations that could be performed by the eyewear 100 or eyewear systems 300 configured in accordance with embodiments of the disclosure. They are not intended to be limiting. Numerous other control operations will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. Eyewear, comprising:
   a frame;
   one or more stems extending distally from the frame, the one or more stems each comprising a temple portion and an ear engagement portion;
   one or more processors disposed within one or more of the frame or the one or more stems; and
   one or more proximity sensor components operable with the one or more processors, each proximity sensor component comprising an infrared signal receiver receiving an infrared emission from an object, the one or more proximity sensor components disposed only in the ear engagement portion at a distal end of the one or more stems;
   the one or more processors operable to execute a control operation when the one or more proximity sensor components receive the infrared emission from the object.

2. The eyewear of claim 1, the one or more stems extending distally from the frame in a rearward direction when in an open position, the infrared signal receiver to receive the infrared emission from the object along the rearward direction.

3. The eyewear of claim 1, the one or more stems comprising a first stem and a second stem, the one or more proximity sensor components comprising a first proximity sensor component disposed behind a first grille defining one or more first apertures through which first infrared emissions can be received and a second proximity sensor component disposed behind a second grille defining one or more second apertures through which second infrared emissions can be received.

4. The eyewear of claim 3, the first grille defining one or more first reception beams in which the first proximity sensor component can receive the first infrared emissions, the one or more first reception beams oriented at least partially in a first direction, and the second grille defining one or more second reception beams in which the second proximity sensor component can receive the second infrared emissions, the one or more second reception beams oriented at least partially in a second direction, the second direction different from the first direction.

5. The eyewear of claim 1, further comprising an audio output device operable with the one or more processors, the control operation comprising causing the audio output device to emit audible sound when the infrared signal receiver receives the infrared emission from the object.

6. The eyewear of claim 5, the audible sound a function of a distance of the object from the infrared signal receiver.

7. The eyewear of claim 1, further comprising a haptic device operable with the one or more processors, the control operation comprising causing the haptic device to deliver a tactile output when the infrared signal receiver receives the infrared emission from the object.

8. The eyewear of claim 7, the tactile output a function of a distance of the object from the infrared signal receiver.

9. The eyewear of claim 4, further comprising a wireless communication device operable with the one or more processors, the control operation comprising causing the wireless communication device to transmit a notification to an external electronic device when the infrared signal receiver receives the infrared emission from the object.

10. The eyewear of claim 9, the notification comprising an indication of whether the infrared emission was received from the one or more first reception beams or the one or more second reception beams.

11. The eyewear of claim 9, the eyewear comprising eyeglasses.

12. The eyewear of claim 1, further comprising:
    an energy storage device, operable with the one or more processors; and
    a photovoltaic device to charge the energy storage device; the photovoltaic device disposed along the temple portion.

13. The eyewear of claim 1, further comprising one or more of an audio capture device or a video capture device, the control operation comprising actuating the one or more of the audio capture device or the video capture device.

14. The eyewear of claim 4, at least one of the first grille or the second grille enabling the one or more proximity sensor components to detect a location of the object relative to the eyewear.

15. The eyewear of claim 14, the at least one of the first grille or the second grille enabling the one or more proximity sensor components to detect whether one or multiple objects are within a thermal detection radius of the eyewear.

16. The eyewear of claim 4, at least one of the first grille or the second grille enabling the one or more proximity sensor components to detect motion by detecting changes across at least one of the one or more first reception beams or the one or more second reception beams.

17. The eyewear of claim 4, further comprising at least one lens through which the one or more first reception beams defined by the first grille pass.

18. The eyewear of claim 17, the at least one lens comprising a predefined number of slits further defining the one or more first reception beams.

* * * * *